(12) United States Patent
Cernohous

(10) Patent No.: US 9,359,499 B2
(45) Date of Patent: Jun. 7, 2016

(54) RADIATION CURABLE POLYMERS

(75) Inventor: Jeffrey Jacob Cernohous, Hudson, WI (US)

(73) Assignee: Stratasys, Inc., Eden Prairie, MN (US)

( * ) Notice: Subject to any disclaimer, the term of this patent is extended or adjusted under 35 U.S.C. 154(b) by 219 days.

(21) Appl. No.: 13/821,851

(22) PCT Filed: May 4, 2012

(86) PCT No.: PCT/US2012/036534
§ 371 (c)(1),
(2), (4) Date: Jan. 16, 2014

(87) PCT Pub. No.: WO2012/151494
PCT Pub. Date: Nov. 8, 2012

(65) Prior Publication Data
US 2014/0121291 A1    May 1, 2014

Related U.S. Application Data

(60) Provisional application No. 61/482,905, filed on May 5, 2011.

(51) Int. Cl.
| | | |
|---|---|---|
| C08F 2/46 | (2006.01) | |
| C08F 2/50 | (2006.01) | |
| C08G 61/04 | (2006.01) | |
| C08L 67/04 | (2006.01) | |
| C08J 3/00 | (2006.01) | |
| C08J 3/28 | (2006.01) | |
| C08L 33/06 | (2006.01) | |

(52) U.S. Cl.
CPC .................. *C08L 67/04* (2013.01); *C08J 3/005* (2013.01); *C08J 3/28* (2013.01); *C08J 2367/04* (2013.01); *C08L 33/06* (2013.01); *C08L 2205/22* (2013.01)

(58) Field of Classification Search
CPC ....................................................... C08L 67/04
USPC .................. 522/33, 6, 71, 189, 184; 520/1
See application file for complete search history.

(56) References Cited

U.S. PATENT DOCUMENTS

| | | | |
|---|---|---|---|
| 4,863,538 A | 9/1989 | Deckard | |
| 5,121,329 A | 6/1992 | Crump | |
| 5,132,143 A | 7/1992 | Deckard | |
| 5,303,141 A | 4/1994 | Batchelder et al. | |
| 5,340,433 A | 8/1994 | Crump | |
| 5,474,719 A | 12/1995 | Fan et al. | |
| 5,503,785 A | 4/1996 | Crump et al. | |
| 5,695,707 A | 12/1997 | Almquist et al. | |
| 5,939,008 A | 8/1999 | Comb et al. | |
| 6,004,124 A | 12/1999 | Swanson et al. | |
| 6,022,207 A | 2/2000 | Dahlin et al. | |
| 6,070,107 A | 5/2000 | Lombardi et al. | |
| 6,129,872 A | 10/2000 | Jang | |
| 6,165,406 A | 12/2000 | Jang et al. | |
| 6,175,422 B1 | 1/2001 | Penn et al. | |
| 6,228,923 B1 | 5/2001 | Lombardi et al. | |
| 6,645,412 B2 | 11/2003 | Priedeman, Jr. | |
| 6,722,872 B1 | 4/2004 | Swanson et al. | |
| 6,790,403 B1 | 9/2004 | Priedeman, Jr. et al. | |
| 6,814,907 B1 | 11/2004 | Comb | |
| 7,236,166 B2 | 6/2007 | Zinniel et al. | |
| 7,255,821 B2 | 8/2007 | Priedeman, Jr. et al. | |
| 7,754,807 B2 | 7/2010 | Priedeman, Jr. et al. | |
| 8,246,888 B2 | 8/2012 | Hopkins et al. | |
| 2002/0002242 A1 | 1/2002 | McNamara et al. | |
| 2004/0054085 A1* | 3/2004 | Tansey ................... B29C 41/18 525/191 |
| 2004/0222561 A1 | 11/2004 | Hopkins | |
| 2005/0004282 A1 | 1/2005 | Priedeman, Jr. et al. | |
| 2005/0260414 A1 | 11/2005 | MacQueen | |
| 2006/0287408 A1* | 12/2006 | Baikerikar et al. ............. 522/71 |
| 2007/0155854 A1 | 7/2007 | Brunner et al. | |
| 2007/0179211 A1* | 8/2007 | Leonard et al. ................. 522/71 |
| 2008/0213419 A1 | 9/2008 | Skubic et al. | |
| 2008/0312377 A1 | 12/2008 | Schmidt et al. | |
| 2010/0096072 A1 | 4/2010 | Hopkins et al. | |
| 2010/0096485 A1 | 4/2010 | Taatjes et al. | |
| 2010/0140849 A1 | 6/2010 | Comb et al. | |

FOREIGN PATENT DOCUMENTS

| | | | |
|---|---|---|---|
| WO | 98/11166 | * | 3/1998 |
| WO | 98/11166 A1 | | 3/1998 |

OTHER PUBLICATIONS

Cray Valley USA, Technical Data Sheet SMA 1440F, Nov. 2013, www.crayvalley.com/docs/TDS/sma-1440-flake.pdf, 1 page.*
Inoue, Takashi, Polymer Blends: Principles and Applications Part 3. Polymer-polymer interface and Reactive Blending, 2005, Nippon Gomu Kyokaishi, Japan Journal of the Society of Rubber Industry, vol. 78, Issue 12, 461-466.*
Inue, Polymer Blends: Principles and Applications Part 3. Polymer-polymer interface and Reactive Blending Machine Translation, 2005, 1-6.*
International Search Report and Written Opinion dated Dec. 31, 2012 for corresponding International Patent Application No. PCT/US2012/036534, filed May 4, 2012.

* cited by examiner

*Primary Examiner* — Ling Choi
*Assistant Examiner* — Jessica E Whiteley
(74) *Attorney, Agent, or Firm* — Westman, Champlin & Koehler, P.A.

(57) ABSTRACT

A polymeric matrix is melt processed with reactive monomers or oligomers that are miscible in the polymeric matrix. Upon initial melt processing and mixing, the reactive monomers or oligomers contained within the resulting polymeric matrix are cured with actinic radiation to form a polymeric alloy. The alloy of the polymeric matrix and the cured polymer possesses a non-equilibrium morphology and a surface energy that is effectively secured for a desired application and use after subsequent compounding.

14 Claims, 1 Drawing Sheet

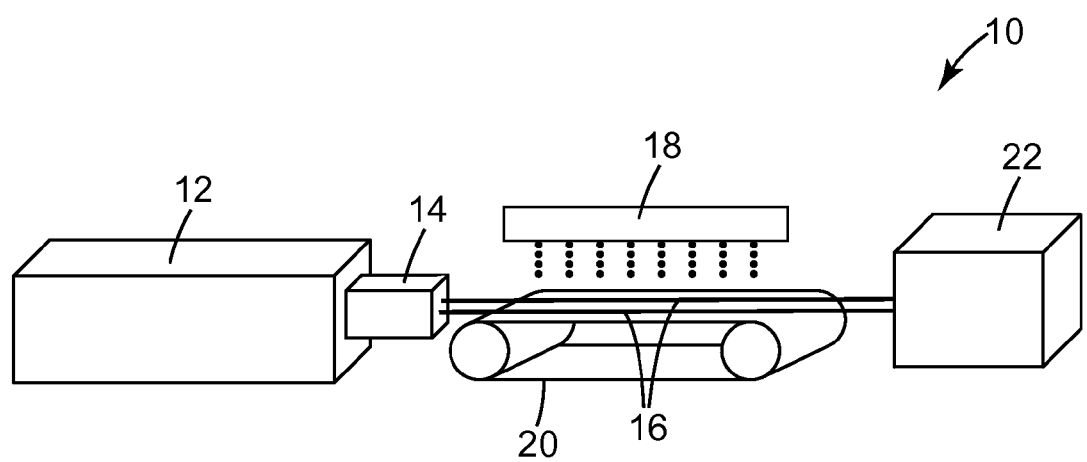

RADIATION CURABLE POLYMERS

CROSS REFERENCE TO RELATED APPLICATIONS

This application claims priority to U.S. Provisional Patent Application No. 61/482,905 filed May 5, 2011, the disclosure of which are herein incorporated by reference in its entirety.

TECHNICAL FIELD

The present disclosure addresses polymer alloys that provide low surface energy and a morphology that remains stable through subsequent melt processing.

BACKGROUND

Surface morphology, surface energy and other physical characteristics of polymers often impact the end application or intended use of a given polymer or polymeric composite. The ability of a polymer to bond to another material, releaseably hold another material, wet a fluid on its surface, or repel a fluid on its surface are often dependent upon the inherent surface morphology or surface energy of the polymer. In certain embodiments, it may be desirable to modify the surface morphology or surface energy of a polymer in order to render it suitable for a specific application. Modification typically embodies the application of a chemical on its surface or treating the surface with a form of energy. Conventional polymer surface modification techniques may include gas plasma, sol-gel process, radiation grafting, photoinduced grafting, surface etching, adsorption, solvent swelling, and the surface deposition of coupling or release compounds. While the noted techniques are capable of addressing surface characteristics, they may, however, adversely impact the polymer and its physical characteristics. Additionally, the conventional processing techniques extend manufacturing cycles and thereby often result in undesirable economics.

SUMMARY

This disclosure is directed to certain polymer alloys that provide low surface energy and a desirable surface morphology to polymers. The low surface energy and surface morphology remain stable through subsequent melt processing of the polymer. This feature enables the use of the materials in certain applications, or physical embodiments, while retaining desirable surface characteristics.

In certain embodiments, a polymeric matrix is melt processed with reactive monomers or oligomers that are miscible in the polymeric matrix. Upon initial melt processing and mixing, the reactive monomers or oligomers contained within the resulting polymeric matrix are cured with actinic radiation to form a polymeric alloy. The alloy of the polymeric matrix and the cured polymer has a non-equilibrium morphology. The non-equilibrium morphology provides a polymeric alloy having a surface energy and morphology that is effectively secured for a desired application and use after subsequent compounding. This approach permits production of a high performance hybrid of a thermoplastic, melt processable matrix and thermoset component that possesses a robust and tailored surface energy. In some embodiments, the polymer matrix and the monomer or oligomer composition may be varied to achieve a desired surface energy.

The composition is produced by melt processing a miscible blend of a polymeric matrix having a curable monomer or oligomer. The blend is irradiated with actinic energy to cure the monomer or oligomer and form the polymeric alloy. The irradiation generally occurs at a temperature above the glass transition temperature ($T_g$) or the melting temperature ($T_m$) of the polymeric matrix. Upon irradiation and then cooling of the polymeric matrix, the composition may then be pelletized or placed in a form suitable for further processing into a desired form, object or article.

The resulting polymeric alloy possesses a non-equilibrium morphology. Without being limited by theory, it is believed that the non-equilibrium morphology is the result of kinetically trapping a component of the polymeric alloy in a state that is not thermodynamically favored. For example, the domain size of one of the polymers may appear compatible or even miscible based upon microscopic analysis of the polymeric alloy. The polymeric alloy may actually undergo a morphological change such as the size or shape change of at least one of the polymer components. In some embodiments, the resulting polymeric alloy has a miscible morphology. In another embodiment, the resulting polymeric alloy has a compatible morphology. In yet another embodiment, the resulting polymeric alloy has an immiscible morphology.

The non-equilibrium morphology of the melt processable compositions enables the retention of desirable physical and chemical characteristics in finished molded materials. Certain embodiments offer enhanced physical or chemical properties including, for example, low surface energy, modified refractive index, impact resistance, and durable mechanical properties.

For purposes of the present invention, the following terms used in this application are defined as follows;

"Actinic energy" means ultraviolet light, visible light, and electronic beam radiation sources;

"Additive" or "Filler" means an organic or inorganic material that does not possess viscoelastic characteristics under the conditions utilized to melt process the filled polymeric matrix;

"Composite" means a mixture of a polymeric material in combination with other non-homogenous materials, such as additives;

"Cure" or "Cured" means to supply sufficient energy to a composition in the form of at least actinic energy to alter the physical state of the composition, to make it transform from a fluid to less fluid state, to go from a soluble to insoluble state, or to decrease the amount of polymerizable material by its consumption in a chemical reaction;

"Dispersed" means distributed throughout the polymeric matrix;

"Ethylenically unsaturated monomers or oligomers" means those monomers or oligomers having carbon-carbon double bonds that possess the ability to "saturate" the molecule by addition of $H_2$;

"Initiator" is used interchangeably and means a material that can change the speed of a chemical reaction;

"Melt Processable Composition" means a formulation that is melt processed, typically at elevated temperatures, by means of a conventional polymer processing technique such as, for example, extrusion or injection molding;

"Melt Processing Techniques" means extrusion, injection molding, blow molding and rotomolding batch mixing;

"Morphology" can be defined as the study of shape, size, texture and phase distribution of physical objects;

"Non-equilibrium Morphology" means a polymeric alloy of two or more distinct polymers wherein at least one component of the polymeric alloy is in a state that is not thermodynamically favored;

"Polymeric Alloy" means a physical blend of one or more polymers; and

"Polymeric Matrix" means a melt processable polymeric material or combination of materials.

The above summary of the present invention is not intended to describe each disclosed embodiment or every implementation of the preset invention. The detailed description that follows more particularly exemplifies illustrative embodiments.

BRIEF DESCRIPTION OF DRAWINGS

FIG. 1 is an illustration of a process suitable for making a melt processable alloy containing a polymeric matrix and a cured polymer.

DETAILED DESCRIPTION

FIG. 1 depicts one embodiment for producing a melt processable alloy containing a polymeric matrix and a cured polymer that has a non-equilibrium morphology. The process 10 includes a melt processing stage 12 that may include conventionally recognized extruders or melt mixers (not shown). The melt processing stage 12 results in a blend of the polymeric matrix and the curable monomer or curable oligomer. As exemplified in FIG. 1, the melt flows from the melt processing stage 12, typically through a die 14 to form strands 16. The strands 16 are feed onto a conveyor 20 and past a curing stage 18. After curing, the strands 16 may then be processed in a pelletizing stage 22 to form individual pellets (not shown).

The polymeric matrix functions as the host polymer and is a component of the melt processable composition upon which the curable monomer or oligomer are added. A wide variety of polymers conventionally recognized in the art as suitable for melt processing are useful as the polymeric matrix. They include both hydrocarbon and non-hydrocarbon polymers. Examples of useful polymeric matrices include, but are not limited to, polyamides, polyimides, polyurethanes, polyolefins, polystyrenes, polyesters, polycarbonates, polyketones, polyureas, polyvinyl resins, polyacrylates and polymethylacrylates. The polymeric matrix comprises about 10 to 99 weight percent of the total composition.

The curable monomer or curable oligomer are included in the polymeric matrix. They are generally miscible or compatible with the matrix during melt processing. In some embodiments, the cured polymer is derived from one or more monomers or oligomers having at least one ethylenically unsaturated moiety. Non-limiting examples of monomers useful in this invention include acylic esters, methacrylic esters, styrene, styrene derivatives, vinyl ethers, vinyl esters, vinyl pyridines, vinyl pyrolidinones, vinyl oxazoles, vinyl oxazolines, vinyl halides, acrylonitrile, acrylamide and acrylamide derivatives. Non-limiting examples of oligomers include oligomeric polyether, polyester, polysiloxanes, and polyolefins that are functionalized with at least one ethylenically unsaturated monomer.

The selection of at least one monomer or oligomer depends on the polymer to be prepared. One of ordinary skill in the art recognizes that suitable homopolymers and copolymers may be prepared utilizing conventional practices. The relative amounts of curable monomers or curable oligomers are apportioned within the polymeric matrix such that, upon curing, they do not adversely impact the subsequently desired melt processing.

In another embodiment, the monomer or oligomer utilized to produce the polymeric alloy is hydrophilic. In another embodiment, the monomer or oligomer is hydrophobic. In another embodiment, the monomer or oligomer is amphiphilic. Those skilled in the art will recognize that incorporation of a hydrophilic monomer can result in increasing the hydrophilicity of the polymeric alloy. This can be practically measured by determining the surface energy of the resultant polymeric alloy (e.g., contact angle measurements). The incorporation of a hydrophilic monomer or oligomer can have the effect of increasing the surface energy of the polymeric alloy when compared to the polymeric matrix. Those skilled in the art will also recognize that the incorporation of a hydrophobic monomer or oligomer can increase the hydrophobicity of the polymeric alloy. This can have the effect of reducing the surface energy of the polymeric alloy when compared to the polymeric matrix. Those skilled the art will also recognize that the incorporation of an amphiphilic monomer or oligomer may provide a polymeric alloy that has a surface energy that is responsive to whether or not it is in contact with either hydrophilic or hydrophobic liquids. Non-limiting examples of hydrophilic monomers and oligomers included acrylated polyglycols and polyols. Non-limiting examples of hydrophobic monomers and oligomers include fluorinated acrylates and acrylated silicones. Non-limiting examples of amphiphilic monomers and oligomers include acrylated silicone polyethers (e.g., TEGO RAD 2250 from Evonik Inc. Hopewell, Va.).

The curable monomer or curable oligomer may be included in the polymeric matrix in amounts ranging from about 1 weight percent to about 90 weight percent.

An initiator may optionally be included in the polymeric matrix in order to assist in the derivation of the cured polymer. One of ordinary skill in the art recognizes that the selection of a specific initiator may be dependant upon the curable monomer or oligomer for a given application and the form of actinic energy employed. Non-limiting examples of initiators include benzoin, benzophenone, and thioxanthone derivatives, as well as the thermostable azo-initiators. Non-limiting examples of specific initiators include benzoin-ethyl ether and benzoin-butyl ether, dichloroacetophenone, diethoxyacetophenone, benzil-dimethyl ketal, 2-chloro-thioxanthone and 2-methylthioxanthone, and dibenzosuberone. In some embodiments, the photoinitiator may be included in the polymeric matrix at levels of about 1 part per million to about 1 percent by weight.

In one alternative embodiment, the materials utilized to derive the polymeric alloy may optionally include a thermally activated free radical initiator along with the monomer or oligomer. A free radical initiator is a species that when melt processed forms reactive free radical moieties. Free radical initiators useful in this invention include organic peroxides and diazocompounds. Non-limiting examples of specific free radical initiators include: benzoyl peroxide, dicumyl peroxide, di-tert-butyl peroxide and azoisobutyronitrile. The free radical initiator may be included in the melt processable composition at amounts less than 0.25% by weight.

In another aspect of the invention, the melt processable composition may contain other additives. Non-limiting examples of conventional additives include antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, coupling agents, and pigments. The additives may be incorporated into the melt processable composition in the form of powders, pellets, granules, or in any other extrudable form. The amount and type of conventional additives in the melt processable composition may vary depending upon the polymeric matrix and the desired physical properties of the finished composition. Those skilled in the art of melt processing are capable of selecting appropriate amounts and types of additives to match with a specific polymeric matrix in order to achieve desired physical properties of the finished material.

The melt processable composition of the invention can be prepared by any of a variety of ways. For example, the polymeric matrix, curable monomer or curable oligomer, optional photoinitiators, and optional additives may be combined together by any of the blending means usually employed in the plastics industry, such as with a compounding mill, a Banbury mixer, or extruder. The polymeric matrix, curable monomer or curable oligomer, optional photoinitiators, and optional additives may be used in the form, for example, of a powder, a pellet, a liquid or a granular product. The mixing operation is most conveniently carried out at a temperature above the melting point or softening point of the polymeric matrix.

In some embodiments utilizing an extruder, melt-processing of the polymeric matrix, curable monomer or curable oligomer, and other optional additives is performed at a temperature generally from 120° to 300° C., although optimum operating temperatures are selected depending upon the melting point, melt viscosity, and thermal stability of the composition. Different types of melt processing equipment, such as extruders, may be used to process the melt processable compositions of this invention. Extruders suitable for use with the present invention are described, for example, by Rauwendaal, C., "Polymer Extrusion," Hansen Publishers, p. 11-33, 2001.

The polymeric matrix, curable monomer or curable oligomer, and optional additives are processed into a form or format that can be readily subjected to actinic energy. For example, the material may flow through a die to form an extrudate in strand form. The strands may be subjected to the actinic radiation then further processed. Alternatively, the extrudate may be pelletized and then subjected to actinic radiation. Non-limiting examples of suitable points for applying actinic energy include in the barrel of the extruder, at the die, after the die, and prior to pelletizing. In some embodiments, it may be desirable to apply the actinic energy above the $T_g$ or $T_m$ of the polymeric matrix as molten polymers will not scatter light as much as crystallized polymers. Those of ordinary skill in the art of melt processing polymers are capable of selecting processing equipment and appropriate extrudate forms for selected materials and applications.

As noted above, the polymeric matrix and curable monomer or curable oligomer are subjected to actinic energy in order to initiate the curing of the monomer or oligomer and form the polymer alloy. Actinic energy means ultraviolet light, visible light, and electronic beam radiation sources. In certain embodiments the actinic energy has at least one wavelength in the range of about 200 nanometers to about 700 nanometers. Optionally, thermal energy may also be applied either with the actinic energy or after application of actinic energy to assist in curing the composition. Examples of thermal energy sources suitable for use with the present invention include induction heating coils, ovens, hot plates, heat guns, infrared sources, lasers, extruder heating sources and microwave sources.

The irradiation of the polymeric matrix and curable monomer or curable oligomer results in a polymer alloy possessing a non-equilibrium morphology. The term morphology can be defined as the study of shape, size, texture and phase distribution of physical objects. For the purposes of this disclosure, morphology relates specifically to a polymeric alloy of a polymeric matrix and a cured polymer. There are numerous types of polymer composites or alloys. Polymer-polymer alloys or blends are a simple physical mixture of two or more polymers. These polymers may form a homogeneous single-phase morphology or a heterogeneous multi-phase morphology when alloyed. This is because most polymers are thermodynamically immiscible. It is also known by those skilled in the art that as the molecular weight of a polymer components of an alloy are increased, they become more immiscible.

The equilibrium morphology of a polymer blend can be realized by annealing the blend above the $T_g$ and $T_m$ of each component. Morphology can change as a result of multiple melt processing steps, which can result in changing mechanical, chemical or thermal properties. Certain embodiments in this disclosure allow for production of polymer blends that have a stable, non-equilibrium morphology after a melt processing step. The morphology of the resulting blends does not significantly charge after further annealing of the blend or composite. Hence, the mechanical, chemical and thermal properties are retained after annealing or subsequent melt processing.

Certain polymers are thermodynamically miscible with one another. In some embodiments, the resulting alloy will typically possess domain sizes less than 100 nm in size. For amorphous polymeric alloys, the resulting miscible blend has good optical clarity because it scatters minimal light. Other polymers may have good compatibility when alloyed. In other embodiments, the resulting alloy may possess domain sizes between 100 nm and 1µ. When melt processing a polymeric alloy, it is possible to rapidly reduce the temperature of the melt to a temperature below the $T_g$ or $T_m$ of at least one of the components. Without being limited by theory, it is possible to kinetically trap the alloy in a non-equilibrium morphology where one of the components is in a state that is not thermodynamically favored. For example, the domain size of one of the polymers may appear compatible or even miscible based on microscopic analysis of the alloy. In another example, a non-equilibrium morphology may exist where one of the polymers has an elongated or fibrillated domain. It is possible to derive polymeric alloys with non-equilibrium morphology possessing either a miscible, immiscible or compatible state.

The resulting material can be subsequently melt processed into the form of the final product shape or article. The composites of this invention are suitable for manufacturing articles in many industries including the building and construction, automotive, medical devices and components, electronics, defense, consumer products industries.

The polymer alloy of this invention may exhibit unique physical, optical or surface properties. Other desirable mechanical, optical, surface, chemical resistance, MVTR, scratch and mar resistance, surface lubricity, or refractive index properties may be achieved.

EXAMPLES

Materials used to generate the following examples include:

| Material | Description |
| --- | --- |
| PLA | Ingeo 2003D poly(lactic acid), commercially available from NatureWorks LLC (Minneapolis, MN) |
| Photoinitiator | Dimethoxy-2-phenylacetophenone, commercially available from Aldrich Chemical Co. (Milwaukee, WI) |
| Oligomer 1 | Acrylated Linseed Oil, commercially available from Aldrich Chemical Co. (Milwaukee, WI) |
| Oligomer 2 | TEGO RAD 2250, commercially avaialable from Evonik Inc. (Hopewell, VA) |
| Oligomer 3 | SR494, Pentaerythritol alkoxylated tetraacrylate, commercially available from Sartomer Inc. (Exton, PA) |

Polymeric alloys were prepared using the following protocol. PLA, photointitiator and oligomer were dry mixed in a plastic bag and gravimetrically fed into a 26 mm co-rotating twin screw extruder (40:1, L:D) fitted with a four strand die (commercial available from Labtech Engineering, Samutprakarn, Thailand). All samples were processed at 200 rpm screw speed using the following temperature profile: Zone 1-2=130° C., Zone 3-4=180° C., Zone 5-6=180° C., Zone 7-8=180° C., Die=180° C. Extruder output was 7 kg/hr. The resulting strands were subsequently transmitted to a conveyor belt affixed with two high intensity UV-LED light sources (wavelength=385 nm, UV LED Lab Curing Unit, commercially available from Air Motion Systems, River Falls, Wis.). After exposure, the strands were subsequently air cooled and pelletized into 0.64 cm pellets. The resulting pellets were injection molded into test specimens following ASTM D638 (tensile) and D790 (flexural) specifications. Injection molding on biodegradable polymer formulations was performed using an 85 ton machine (commercially available from Engel Corporation, York, Pa.) having a barrel and nozzle temperature of 175° C. The flexural and impact properties were subsequently tested as specified in ASTM D790 and D256; respectively.

Table 1 gives the formulations for polymeric alloy compositions comparative example CE1 and examples 1-6 that were produced. Table 2 gives the mechanical and flame retardant properties for polymer alloy compositions comparative example CE1 and examples 1-6.

TABLE 1

Formulations for Biodegradable Polymer Formulations Comparative Example CE1 and Examples 1-6

| Example | PLA (wt %) | Photo-initiator (wt %) | Oligomer 1 (wt %) | Oligomer 2 (wt %) | Oligomer 3 (wt %) |
| --- | --- | --- | --- | --- | --- |
| CE1 | 100 | — | — | — | — |
| 1 | 95 | — | 5 | — | — |
| 2 | 95 | — | — | 5 | — |
| 3 | 95 | — | — | — | 5 |
| 4 | 94.9 | 0.1 | 5 | — | — |
| 5 | 94.9 | 0.1 | — | 5 | — |
| 6 | 94.9 | 0.1 | — | — | 5 |

TABLE 2

Mechanical Properties of Comparative Examples CE1 and Examples 1-6

| Example | Flexural Modulus (MPa) | Flexural Strength (MPa) | Tensile Strength (MPa) | Elongation at Break (%) | Unnotched Impact Strength (J/m) |
| --- | --- | --- | --- | --- | --- |
| CE1 | 2940 | 106 | 32 | 1.2 | 217 |
| 1 | 2790 | 75 | 53 | 2.3 | 294 |
| 2 | 2800 | 98 | 53 | 2.2 | 588 |
| 3 | 2900 | 96 | 33 | 1.5 | 171 |
| 4 | 2900 | 76 | 53 | 2.6 | 305 |
| 5 | 2800 | 98 | 58 | 4.5 | 590 |
| 6 | 2900 | 96 | 34 | 2.1 | 195 |

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A melt processable composition comprising a melt processable polymeric alloy containing a polymeric matrix and a cured polymer wherein the melt processable polymeric matrix and the cured polymer have a stable, non-equilibrium morphology.

2. A composition according to claim 1, wherein the cured polymer is derived from a precursor monomer or oligomer that is miscible in the polymeric matrix during melt processing and wherein the precursor monomer or oligomer is present in the matrix in an amount ranging from about 1 weight percent to about 90 weight percent.

3. A composition according to claim 1, wherein the cured polymer is derived from one or more monomers or oligomers selected from acylic esters, methacrylic esters, styrene, styrene derivatives, vinyl ethers, vinyl esters, vinyl pyridines, vinyl pyrolidinones, vinyl oxazoles, vinyl oxazolines, vinyl halides, acrylonitrile, acrylamide, acrylamide derivatives, oligomeric polyether, oligomeric polyester, oligomeric polysiloxanes, and oligomeric polyolefins, wherein the oligomers are functionalized with at least one ethylenically unsaturated monomer.

4. A composition according to claim 3, wherein the monomer or oligomer has at least one moiety that is ethylenically unsaturated.

5. A composition according to claim 3, wherein the monomer or oligomer is hydrophilic, hydrophobic, or amphiphilic.

6. A composition according to claim 3, further comprising an initiator for the derivation of the cured polymer.

7. A composition according to claim 6, wherein the initiator is a photoinitiator and the photoiniator is benzoin, benzophenone, or thioxanthone derivatives.

8. A composition according to claim 1, further comprising one or more antioxidants, light stabilizers, fibers, blowing agents, foaming additives, antiblocking agents, heat stabilizers, impact modifiers, biocides, compatibilizers, flame retardants, plasticizers, tackifiers, colorants, processing aids, lubricants, coupling agents, and pigments.

9. A composition according to claim 1, wherein the polymeric matrix is one or more of polyamides, polyimides, polyurethanes, polyolefins, polystyrenes, polyesters, polycarbonates, polyketones, polyureas, polyvinyl; resins, polyacrylates, and polymethylacrylates.

10. A method comprising curing by actinic radiation a portion of a melt processed polymeric matrix, wherein the polymeric matrix has a curable monomer or curable oligomer dispersed in the polymeric matrix and the polymeric matrix comprising the cured monomer or cured oligomer have a stable, non-equilibrium morphology.

11. A method comprising melt processing a polymeric matrix having a curable monomer or curable oligomer and irradiating the polymeric matrix to form a cured polymer in the polymeric matrix, wherein the melt processable polymeric matrix and the cured polymer are in a stable, non-equilibrium morphology.

12. A method according to claim 11, wherein irradiating occurs above a $T_g$ or $T_m$ value of the polymeric matrix.

13. The method according to claim 10, wherein actinic energy includes ultraviolet radiation, visible light radiation, and electronic beam radiation.

14. A method according to claim 11, further comprising palletizing the polymeric matrix and cured polymer.

* * * * *